United States Patent
Chen et al.

(10) Patent No.: US 11,726,761 B2
(45) Date of Patent: Aug. 15, 2023

(54) FIRMWARE UPGRADE FOR WIRELESS STEREO EARBUDS

(71) Applicant: TYMPHANY ACOUSTIC TECHNOLOGY (HUIZHOU) CO., LTD., Huizhou (CN)

(72) Inventors: Hung-Fen Chen, Taipei (TW); Peng-Jie Hong, Taipei (TW)

(73) Assignee: TYMPHANY ACOUSTIC TECHNOLOGY (HUIZHOU) CO., LTD., Huizhou (CN)

( * ) Notice: Subject to any disclaimer, the term of this patent is extended or adjusted under 35 U.S.C. 154(b) by 467 days.

(21) Appl. No.: 16/713,851

(22) Filed: Dec. 13, 2019

(65) Prior Publication Data

US 2020/0310780 A1 Oct. 1, 2020

Related U.S. Application Data

(60) Provisional application No. 62/823,882, filed on Mar. 26, 2019.

(51) Int. Cl.
*G06F 8/65* (2018.01)
*H04W 4/20* (2018.01)
(Continued)

(52) U.S. Cl.
CPC .............. *G06F 8/65* (2013.01); *H04R 1/1016* (2013.01); *H04R 1/1041* (2013.01); *H04W 4/20* (2013.01); *H04W 4/80* (2018.02); *H04R 2420/07* (2013.01)

(58) Field of Classification Search
CPC .......... H04R 2420/07; H04R 2201/107; H04R 2460/17; H04R 1/1016; H04R 1/1041; G06F 8/65; H04W 4/80; H04W 4/20
See application file for complete search history.

(56) References Cited

U.S. PATENT DOCUMENTS

| 2012/0198434 A1* | 8/2012 | Dirstine | G06F 8/65 717/172 |
| 2016/0004528 A1* | 1/2016 | Price | G06F 8/65 717/173 |

(Continued)

OTHER PUBLICATIONS

Carlos E. Andrade et al.; Managing Massive Firmware-Over-The-Air Updates for Connected Cars in Cellular Networks; ACM; pp. 65-72; retrieved on Mar. 9, 2023 (Year: 2017).*

(Continued)

*Primary Examiner* — S. Sough
*Assistant Examiner* — Cuong V Luu
(74) *Attorney, Agent, or Firm* — Muncy, Geissler, Olds & Lowe, P.C.

(57) ABSTRACT

Systems and methods of updating firmware in a pair of wireless earbuds including at least a first earbud and a second earbud, may include wirelessly receiving at the first earbud a firmware update transmitted by a computing device; upgrading the first earbud, using the firmware update, during a first upgrade time interval; wirelessly receiving at the second earbud the firmware update; and upgrading the second earbud, using the firmware update, during a second upgrade time interval; wherein the first upgrade time interval and the second upgrade time interval at least partially overlap, resulting in a total firmware upgrade time interval for upgrading the first and the second earbuds being shorter than a sum of the first upgrade time interval and the second upgrade time interval.

18 Claims, 10 Drawing Sheets

(51) Int. Cl.
*H04R 1/10* (2006.01)
*H04W 4/80* (2018.01)

(56) References Cited

U.S. PATENT DOCUMENTS

| | | | | |
|---|---|---|---|---|
| 2017/0102934 | A1* | 4/2017 | Xu | H04L 41/20 |
| 2018/0124491 | A1* | 5/2018 | Dragicevic | H04R 1/08 |
| 2018/0249240 | A1* | 8/2018 | Koss | H04R 3/00 |
| 2019/0327550 | A1* | 10/2019 | Lindén | H04R 1/1025 |
| 2019/0327778 | A1* | 10/2019 | Morris | H04W 76/15 |
| 2021/0136479 | A1* | 5/2021 | Yang | G06F 8/65 |

OTHER PUBLICATIONS

Solon Falas; A Modular End-to-End Framework for Secure Firmware Updates on Embedded Systems; ACM; 19 pages; retrieved on Mar. 9, 2023 (Year: 2021).*

* cited by examiner

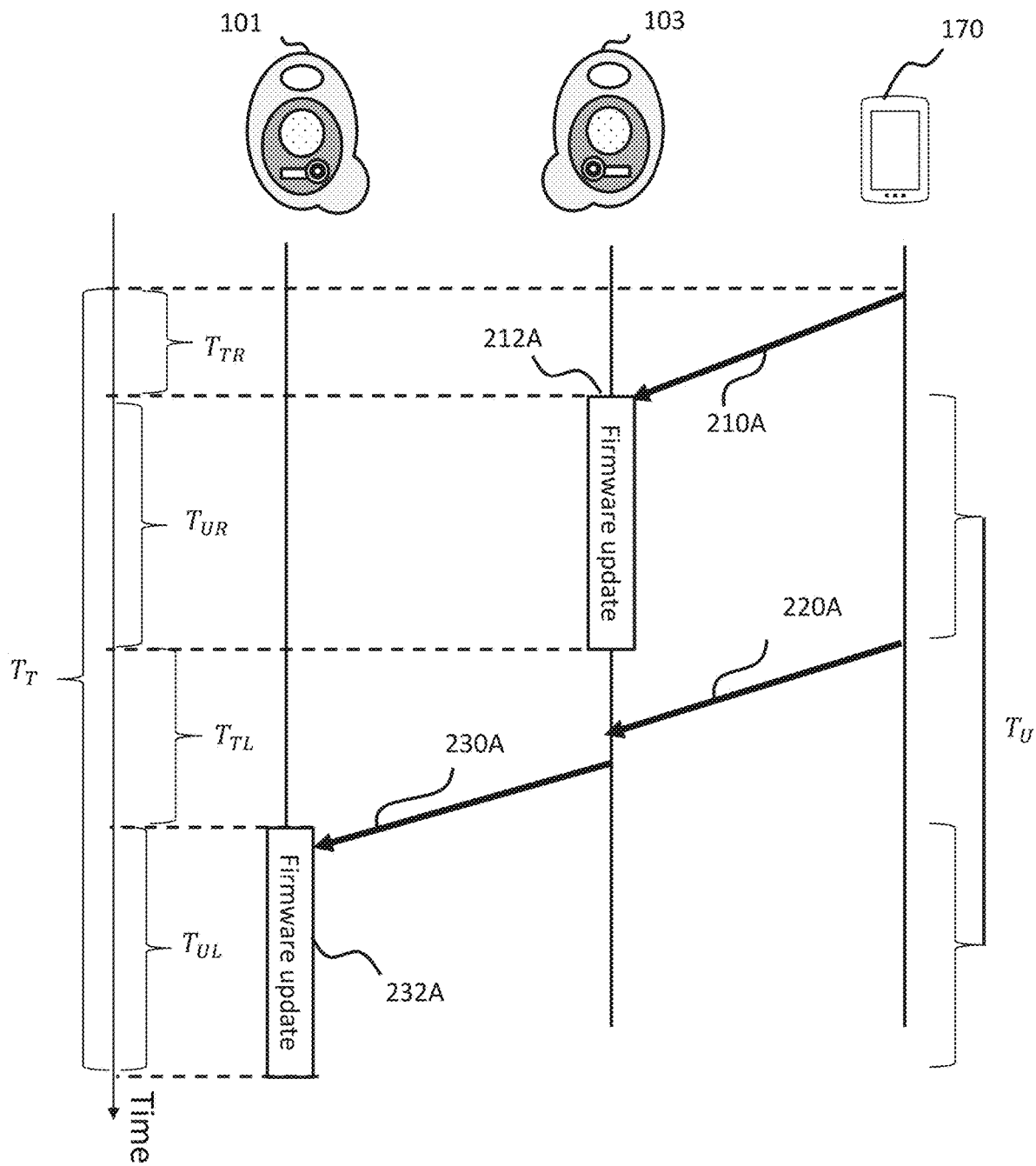

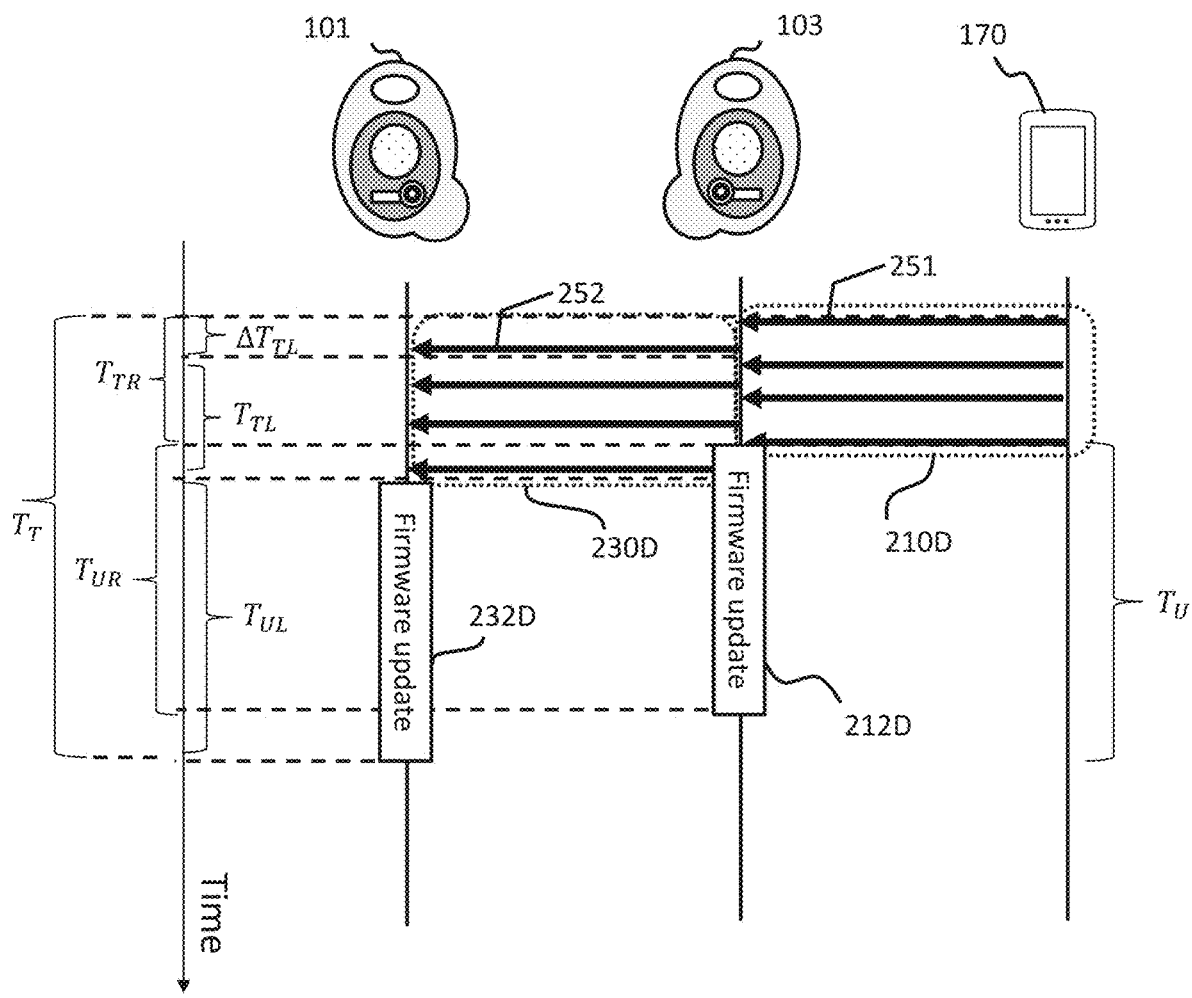

FIRMWARE UPGRADE FOR WIRELESS STEREO EARBUDS

CROSS REFERENCE TO RELATED APPLICATIONS

This application claims the benefit of U.S. Provisional Application No. 62/823,882 filed Mar. 26, 2019, and incorporated herein by reference in its entirety.

TECHNICAL FIELD

The present disclosure generally relates to the field of wireless headphones, and more particularly to firmware upgrade of wireless earbuds in which the wireless earbuds are used with a computing device.

BACKGROUND

Wireless earphones, also known as wireless earbuds, wireless in-ear headphones, earphones, or wireless ear pods may communicate with various user devices using wireless communication such as, for example, a Bluetooth communication. To keep the earbuds updated, the earbud firmware may be upgraded from time to time. Such upgrade may enable installation of enhanced functionalities or operation capabilities, new wireless protocols for communication, improved processing capabilities of received audio signals, improved speaker driver functionality, and the like. Other upgrades may address security issues, fix bugs in the existing firmware, and the like. Such upgrades may improve operation of earbuds and may be performed incrementally and/or periodically.

SUMMARY

Disclosed embodiments include systems and methods for updating firmware in a pair of wireless earbuds. The wireless earbuds may include at least a first earbud and a second earbud. The updating method may include wirelessly receiving at the first earbud a firmware update transmitted by a computing device, upgrading the first earbud, using the firmware update, during a first upgrade time interval; wirelessly receiving at the second earbud the firmware update; and upgrading the second earbud, using the firmware update, during a second upgrade time interval; wherein the first upgrade time interval and the second upgrade time interval at least partially overlap, resulting in a total firmware upgrade time interval for upgrading the first and the second earbuds being shorter than a sum of the first upgrade time interval and the second upgrade time interval Consistent with disclosed embodiments, a system for updating firmware is provided. The system may include a pair of wireless earbuds comprising at least a first earbud and a second earbud, at least the first earbud being configured to communicate with a computing device. The system may further comprise at least one processor associated with the first earbud, the at least one processor of the first earbud being configured to receive a firmware update transmitted by a computing device and use the firmware update to upgrade the first earbud during a first upgrade time interval. The system may also include at least one processor associated with the second earbud, the at least one processor of the second earbud being configured to: receive the firmware update; and use the firmware update to upgrade the second earbud during a second upgrade time interval; wherein the first upgrade time interval and the second upgrade time interval at least partially overlap, resulting in a total time interval for upgrading the first and the second earbuds being shorter than a sum of the first and the second upgrade time intervals.

Consistent with other disclosed embodiments, a memory device storing instructions may store program instructions, which are executed by at least one processor device and perform any of the methods described herein.

The foregoing general description and the following detailed description are exemplary and explanatory only and are not restrictive of the claims.

BRIEF DESCRIPTION OF DRAWINGS

FIGS. 2A-2E are example diagrams representative of processes for upgrading the firmware in a pair of earbuds consistent with the present disclosure.

DETAILED DESCRIPTION

The present disclosure relates generally to systems and methods for updating firmware and/or software for earbud audio devices. The system may include a set of earbuds configured to communicate with one or more computing devices. As described below, firmware/software updates for at least a left earbud and a right earbud in a pair of earbuds may be performed during overlapping time periods. Such an arrangement may streamline the firmware/software upgrade process.

Figure 1A:
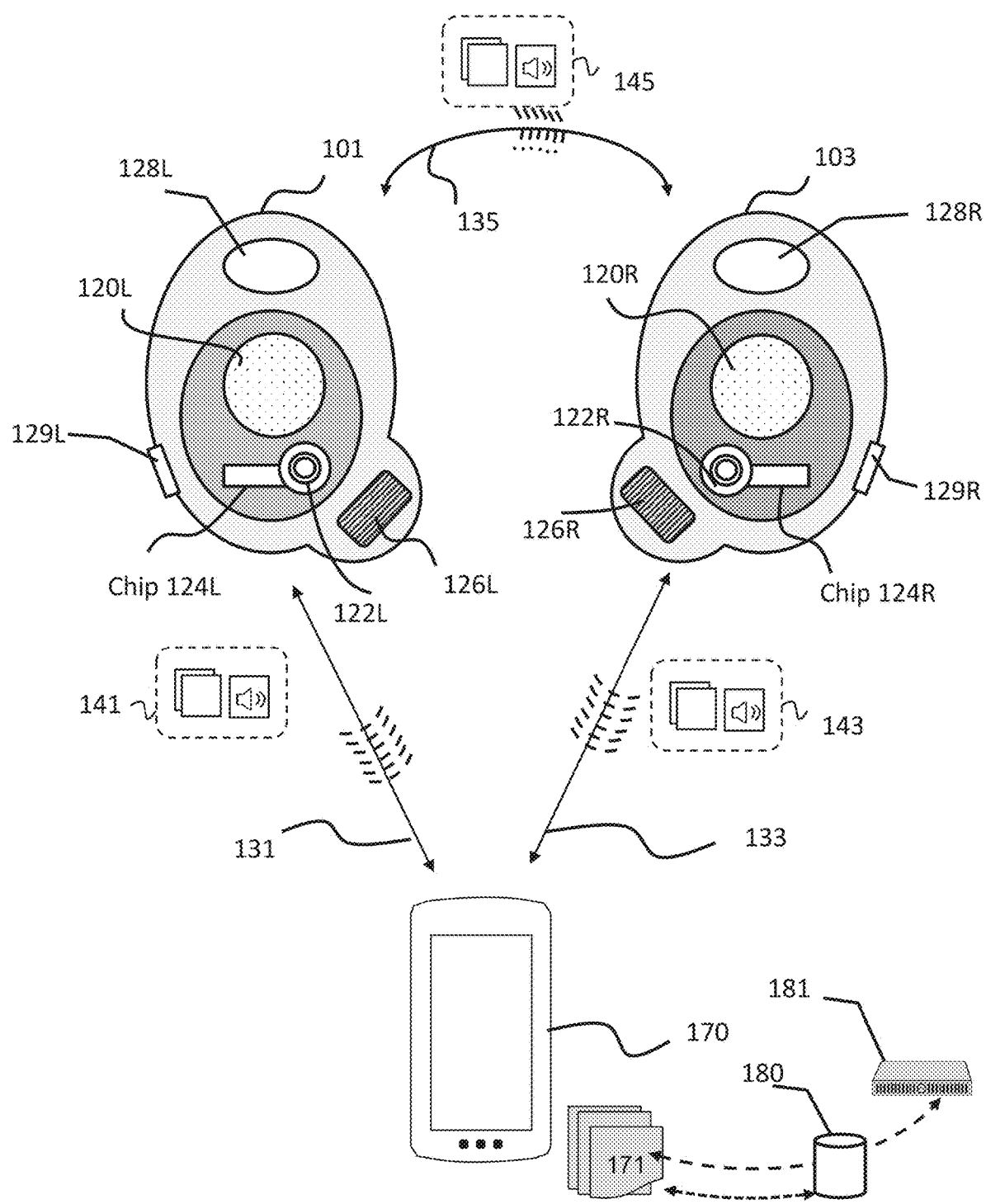
FIG. 1A shows example components of a system of wireless earbuds and a computing device consistent with the present disclosure.

In one embodiment consistent with the present disclosure, a method of updating the firmware in a pair of wireless earbuds may include receiving by the earbuds a firmware update. In an example embodiment, as shown in FIG. 1A, the pair of earbuds may include a first earbud and a second earbud, e.g., the first earbud is a right earbud 103, and the second earbud is a left earbud 101. Left earbud 101 may include a left sound-producing device 120L (e.g., a speaker), a left communication device 122L, a left chip 124L, and a left microphone 126L. In an example embodiment, left communication device 122L may include a short-range wireless audio module, which may include at least one main printed circuit board having disposed thereon. Further, device 122L may include circuitry for wireless radio communication. The wireless audio module may comprise a transmitter, a receiver, a transmitter-receiver pair, such as a transceiver, a radio unit, and the like. Similarly, right earbud 103 may include a right sound-producing device 120R, a right communicating device 122R, a right chip 124R, and a right microphone 126R. In various embodiments, communication device 122R may be similar, or the same as communication device 122L. Other components of right earbud 103 (e.g., right sound-producing device 120R, chip 124R, and right microphone 126R) may be the same as their left counterparts. It should be noted, that in some cases, microphones 126L and/or 126R may not be present. Additionally, left earbud 101 and right earbud 103 may each include corresponding rechargeable batteries 128L and 128R, corresponding battery charging ports 129L and 129R, and other elements commonly found in wireless earbuds.

In various embodiments, processing functions of chip 124L and 124R may be implemented by different components, including but not limited to central processing units (CPUs), digital signal processor (DSPs), application-specific integrated circuits (ASICs) or field-programmable gate arrays (FPGAs).

In various embodiments, left earbud 101 and right earbud 103 may communicate with a computing device 170. Computing device 170 may include any suitable device for exchanging data with the wireless earbuds. For example, computing device 170 may be a smartphone, a tablet, a gaming console, a notebook, a laptop, a desktop, a virtual reality device, a personal digital assistant, a cellphone, a smart TV, a smartwatch, and the like. In various embodiments, computing device 170 may, for instance, be capable of connecting to a mobile telecommunication network in compliance with a mobile telecommunication standard, such as (without limitation) GSM, UMTS, LTE, LTE Advanced, CDMA, or TD-SCDMA, and/or to a data communication network, such as the Internet. Computing device 170 may be capable of connecting to other devices or networks via different wireless protocols such as Bluetooth (BT), Bluetooth Low Energy (BLE), Zigbee, NFC, Wi-Fi, or any other short-range communication protocols.

In an example embodiment, computing device 170 may exchange audio data, as well as data controlling various aspects of the operation of the wireless earbuds (e.g., firmware related data) with the wireless earbuds. In an example embodiment, computing device 170 may include application 171 for facilitating communication with left and right earbuds 101 and 103. For example, application 171 may transmit audio data and firmware upgrade data to earbuds 101 and 103. Additionally, application 171 may monitor the availability of upgrades by, for example, checking an external database 180 containing firmware upgrades or identifying available upgrades. In an example embodiment, database 180 may be a cloud-based database associated with a supplier of the wireless earbuds. In some cases, a server 181 associated with database 180 may be configured to send notifications to computing device 170 via application 171 when a firmware upgrade is available.

As shown in FIG. 1A, left earbud 101 and right earbud 103 may communicate with computing device 170 using any suitable wireless communication (e.g., short-range communication, Bluetooth Low Energy (BLE), Bluetooth, Bluetooth 5.0, Wi-Fi, NFC, and the like). Left earbud 101 and right earbud 103 may further be configured to communicate with each other using any suitable short-range wireless communication, such as Bluetooth, BLE, Wi-Fi, and the like). In some cases, wireless earbuds communicate with computing device 170 using various any suitable Bluetooth version (e.g., version 4.0 or version 5.0). Additionally, or alternatively, the wireless earbuds may communicate with computing device 170 using AirPlay, PlayFi, Miracast, WiDi, DLNA or Wi-Fi Direct, for instance, or any combinations thereof.

In exemplary embodiments, BLE may operate in the 2.4 GHz band and may support very short data packets (for example, 8 octets minimum up to 27 octets maximum) that are transferred at, for example, 1 Mbps. The BLE connections may use advanced sniff-sub rating to achieve ultra-low duty cycles. The BLE technology also may use the adaptive frequency hopping, common to all versions of Bluetooth® technology, to minimize interference from other technologies in the 2.4 GHz ISM Band. The BLE technology may enable efficient multi-path benefits that increase the link budgets and range. The BLE technology also can support connection setup and data transfer as low as 3 ms, allowing an application to form a connection and then transfer authenticated data in few milliseconds for a short communication burst before quickly tearing down the connection. Moreover, increased modulation index provides a possible range for BLE technology of over 100 meters. The BLE technology may use a 24-bit cyclic redundancy check (CRC) on packets to ensure the maximum robustness against interference. The BLE technology may include full Advanced Encryption Standard-128 (AES-128) encryption using continuity check message ("CCM") to provide encryption and authentication of data packets. The BLE technology may be optimized for one-to-one connections while allowing one-to-many connections using, for example, a star topology.

It is contemplated that BLE is used for illustrative purposes only. The present disclosure does not limit the wireless protocols used for coupling device 170 and the wireless earbuds. For example, device 170 may also be coupled to the wireless earbuds using Wi-Fi® based on the IEEE 802.11 standard (operating at 2.4 GHz, 3.6 GHz, 5 GHz, 60 GHz, etc. frequency bands), or using ZigBee® based on the IEEE 802.15.4 standard (operating at 915 MHz, 2.4 GHz, etc. frequency bands).

It should be noted that several different communication channels may be available. For example, computing device 170 may communicate with earbuds 101 and 103 using both Bluetooth and BLE. Various communication pathways are indicated in FIG. 1A by connection arrows 131, 133, and 135. For example, connection arrow 131 shows communication path of computing device 170 with left earbud 101, connection arrow 133 shows communication path of computing device 170 with right earbud 103, and connection arrow 135 shows communication path between left earbud 101 and right earbud 103.

In various embodiments, any suitable pattern of communication may be used for communicating audio and firmware data/upgrades to the wireless earbuds from computing device 170. In some embodiments, computing device 170 may independently communicate with left earbud 101 and/or right earbud 103. In some cases, if computing device communicates with left earbud 101, left earbud 101 may act as a relay to transmit signals between right earbud 103 and device 170. If device 170 communicates with right earbud 103, right earbud 103 may act as a relay to transmit signals between left earbud 101 and device 170. For example, device 170 may transmit to right earbud 103, data 143 via connection 133, as shown in FIG. 1A. Additionally, or alternatively, device 170 may transmit to left earbud 101 data 141 via connection 131. In various embodiments, data 143 and 144 may include audio data (e.g., data that may be converted into an audio signal by the sound-producing device), and firmware upgrade data (e.g., data used upgrade control operations and other functionality of the earbuds). In some cases, computing device 170 may transmit data 143 to right earbud 103 first, and then transmit data 141 to left earbud 101. Alternatively, the order of data transmission may be reversed. In some cases, device 170 may transmit data 143 via connection 133 to right earbud 103, and earbud 103 may transmit at least part of data 143 to left earbud 101 (e.g., data 145, as shown in FIG. 1A). Alternatively, device 170 may transmit data 141 via connection 131 to left earbud 101, and earbud 101 may transmit at least part of data 141 to right earbud 103 (e.g., data 145, as shown in FIG. 1A). In some embodiments, earbuds 101 and 103 may receive respective data 141 and 143, process the received data using respective chips 124L and 124R, and exchange the processed data via connection 135.

In an example embodiment, one of the earbuds (e.g., right earbud 103) may receive a firmware update (e.g., data 143). Upon receiving the firmware update, it may store the received firmware update in the memory element associated with right earbud 103. In various embodiments, right earbud 103 may be configured to forward the received firmware update to left earbud 101. In an example embodiment, after completion of transmission of the firmware update to left earbud 101, both left earbud 101 and right earbud 103 may simultaneously update their firmware using the received firmware update, such that a time interval for updating the left earbud at least partially overlaps with a time interval for updating the right earbud. Alternatively, the left earbud may receive the transmitted firmware update and forward the update to the right earbud. Further, the firmware update may be transmitted independently to each of the left and right earbuds either serially or during overlapping transmission times.

Figure 1B:
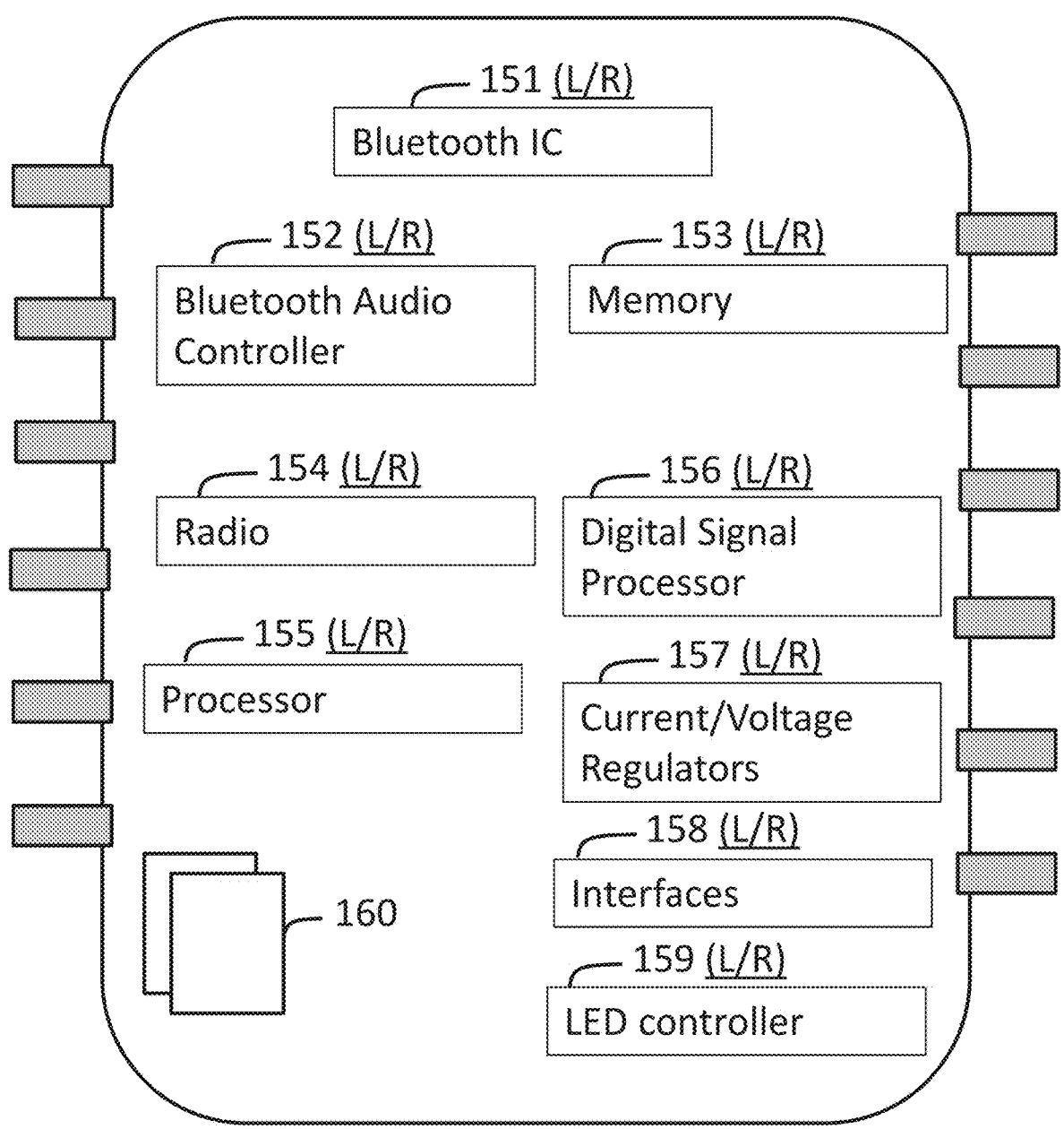
FIG. 1B shows example components of a chip for a wireless earbud consistent with the present disclosure.

In some embodiments of the present disclosure, chip 124L and/or chip 124R may include various hardware and software components, as shown in FIG. 1B. For example, chip 124L or 124R (124 (L/R)) a programmable Bluetooth® integrated circuit (IC) 151(L/R). Chip 124 (L/R) may include, for example, a Bluetooth® audio controller 152 (L/R), which may be capable of performing ultra-low-power digital signal processing. Chip 124 (L/R) may feature internal memory 153 (L/R) (e.g., non-transient memory), a radio 154 (L/R), a processor 155 (L/R), a digital signal processor 156 (L/R), and a Bluetooth software 160. In various embodiments, the same software 160 may be used for right earbud 103 and for left earbud 101. In an example embodiment, software 160 may be a firmware upgrade and can be uploaded to left earbud 101 and right earbud 103 from a computing device 170. Software 160 may include a stereo audio codec and may control various operations associated with chip 124 (L/R) such as operations related to noise reduction and signal processing. Chip 124 (L/R) may have various electrical components such as current/voltage regulators 157 (L/R) (e.g., integrated switch-mode regulators, linear regulators, and the like), interfaces 158 (L/R) (e.g., serial interfaces, and the like), light emitting diode (LED) controllers 159 (L/R), and the like.

In some embodiments, as described above, a need for a firmware update in earbuds 101 and 103 may be determined automatically by application 171 communicating with server 181 or database 180. In an example embodiment, application 171 may periodically check the availability of new firmware updates and download the new firmware update once it becomes available. In some cases, when a new firmware update is available for computing device 170, upon establishing a wireless connection between at least one of earbuds 101 and 103 with computing device 170, application 171 may initiate transmission of the new firmware update. In an example embodiment, device 170 may ask the user to agree on such update, and proceed with the update upon confirmation from the user.

In various embodiments, a single code (e.g., software 160) may be used for updating both earbuds 101 and 103. In an example embodiment, one of the earbuds (e.g., right earbud 103) may receive software 160 via connection 133 and retransmit software 160 to left earbud 101 via connection 135. Alternatively, left earbud 101 may receive software 160 via connection 131 and retransmit software 160 to right earbud 103 via connection 135. In another embodiment, computing device 170 may transmit software 160 to left earbud 101 via connection 131 and to right earbud 103 via connection 133. In some cases, computing device 170 may transmit software 160 to left earbud 101 and to right earbud 103 simultaneously, and in some cases, device 170 may transmit software 160 to a first earbud (e.g., right earbud 103) followed by transmission to a second earbud (e.g., left earbud 101). Whether computing device 170 is capable of transmitting software 160 to both earbuds simultaneously, may depend on a variety of factors associated with hardware and/or software of computing device 170. If, for example, computing device 170 utilizes Bluetooth 5.0, it may be configured to communicate with both earbuds simultaneously using separate communication channels (e.g., communication connections 131 and 133) for respective earbuds 101 and 103. Alternatively, for older versions of Bluetooth (e.g., Bluetooth 4.0) computing device 170 may interact with one external computing component (e.g., one earbud) at a time.

FIG. 2A illustrates an example of a firmware update process 200. In this example, short-range communication may be established between computing device 170 and an earbud (e.g., right earbud 103). Once the short-range connection is established, computing device 170 may transmit a firmware update to right earbud 103 at step 210A. In an example embodiment, step 210A may last for a time interval $T_{TR}$ that is needed to transmit and store the firmware update for right earbud 103. This time interval, $T_{TR}$ may also be referred to as a first transmission time interval, as opposed to a second transmission time interval $T_{TL}$ that is used to transmit and store the firmware update for left earbud 101, as further described below. In an example embodiment, a BLE, Bluetooth (e.g., Bluetooth 4.0, or Bluetooth 5.0) may be used for transmission of the firmware update to right earbud 103.

In various embodiments, the firmware update for right earbud 103 may be specific to right earbud 103. In other cases, the same firmware update may be used to upgrade both the left and right earbuds (e.g., where a firmware update includes upgrade components associated with the left earbud and other upgrade components associated with the right earbud). Upon receiving the firmware update at step 210A, right earbud 103 may update its firmware at step 212A. In an example embodiment, step 212A may last for a time interval $T_{UR}$ that is needed to update the firmware for right earbud 103. Such a time interval, $T_{UR}$ may also be referred to as a first upgrade time interval, as to differentiate it from a second upgrade time interval $T_{UL}$ during which the firmware for left earbud 101 is updated, as further described below. After completion of step 212A, right earbud 103 may request firmware update for left earbud 101 from computing device 170. At step 220A, computing device 170 may transmit firmware update for left earbud 101 to right earbud 103, and at step 230A, right earbud 103 may transmit firmware update to left earbud 101. In an example embodiment, a BLE, Bluetooth (e.g., Bluetooth 4.0, or Bluetooth 5.0), and the like may be used for transmission of the firmware update to right earbud 103 at steps 210A, 220A and/or step 230A. In some cases, at steps 210A or 220A, the BLE may be used, and at step 230A, the Bluetooth may be used. In some cases, at step 220A a Wi-Fi, NFC, and the like may be used.

Figure 2B:
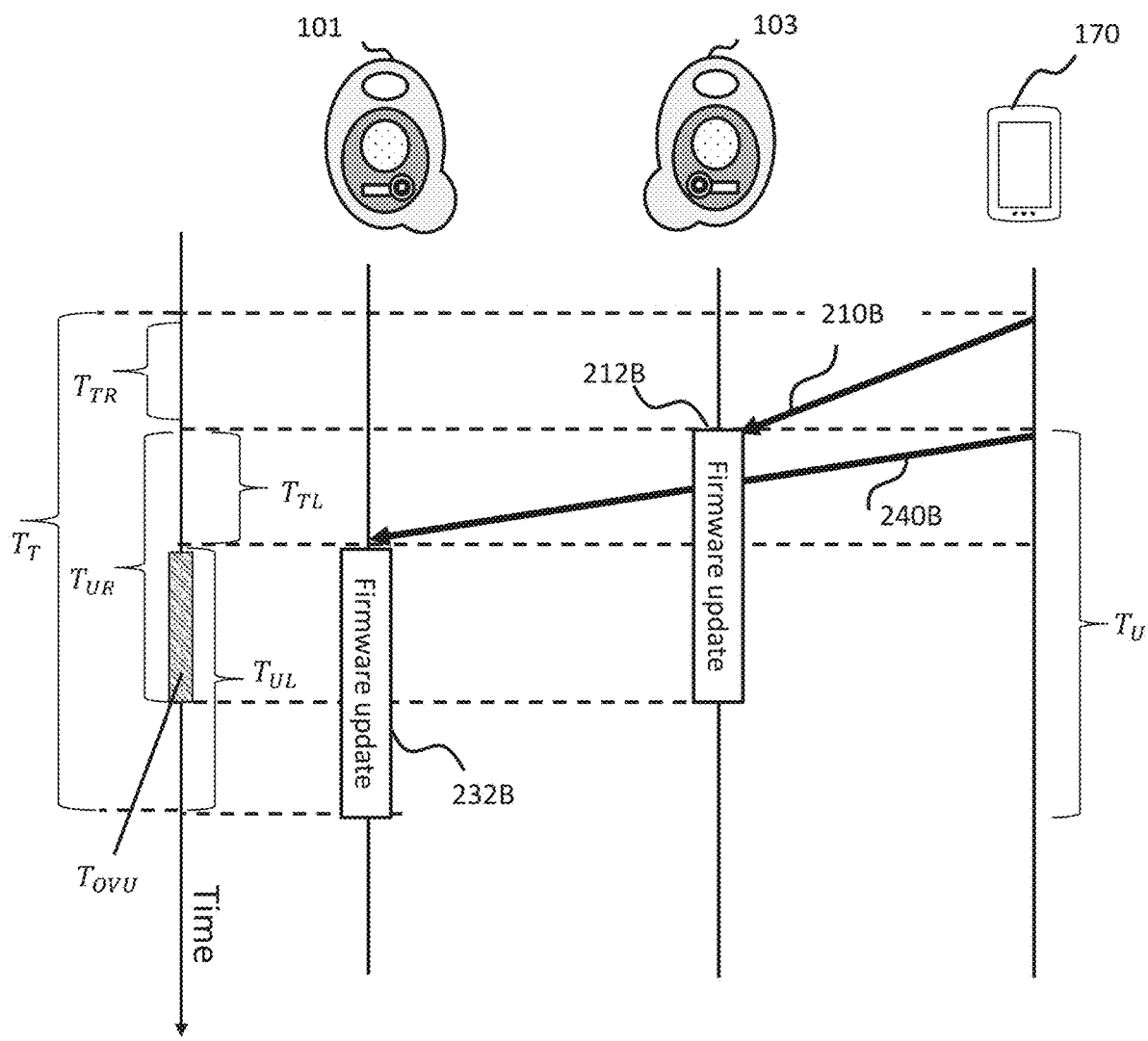

Step 220A and step 230A may last for a combined time interval $T_{TL}$ that is needed to transmit and store the firmware update for left earbud 101. At step 232A, left earbud 101 may update its firmware and transmit a notification to right earbud 103 and/or computing device 170 that firmware has been updated. In an example embodiment, step 232A may have a duration of time $T_{UL}$ that is needed to update the firmware for left earbud 101. As seen in FIG. 2A, a total update time $T_T$ includes the time for transmission of the firmware and the time for firmware upgrade of two earbuds. In the particular example of FIG. 2A, total update time $T_T$ corresponds to a sum of $T_{UR}$, $T_{UL}$, $T_{TR}$, and $T_{TL}$ as none of the times intervals $T_{UR}$, $T_{UL}$, $T_{TR}$, and $T_{TL}$ overlap. In this example, the total firmware upgrade time (e.g., the time required to upgrade the firmware of both the left and right earbuds) is $T_U=T_{UL}+T_{UR}$, for the process shown in FIG. 2A. The total update time $T_T$ is different from total firmware upgrade time $T_U$, as $T_T$ includes a component associated with times for transmission of the firmware updates. In various cases, $T_T \geq T_U$.

as Another exemplary embodiment, which may result in shorter firmware upgrade times, is shown in FIG. 2B. In this embodiment, computing device 170 may transmit firmware update to right earbud 103 at step 210B of an example process 201. While right earbud 103 upgrades its firmware at step 212B, computing device 170 may transmit firmware update to left earbud 101 at step 240B. Steps 210B and 240B may have respective time intervals $T_{TR}$, and $T_{TL}$ for transmitting and storing the firmware for respective right and left earbuds 101 and 103. In an example embodiment, a BLE, Bluetooth (e.g., Bluetooth 4.0, or Bluetooth 5.0), and the like may be used for transmission of the firmware update to right earbud 103 at step 210B and/or step 240B.

At steps 212B and 232B, right and left earbuds 101 and 103 may upgrade its firmware for the respective duration of time $T_{UR}$ and $T_{UL}$. In various embodiments, there may be separate firmware upgrade versions specific to the left and right earbuds. In other cases, the same firmware update may be transmitted both of the earbuds. During process 200, right earbud 103 is responsible for receiving the firmware upgrade version for left earbud 101 and retransmitting that firmware upgrade along to left earbud 101. During process 200, earbuds 101 and 103 may be upgraded simultaneously such that the time interval $T_{UR}$ for the right earbud 103 upgrade at least partially overlaps with the time interval $T_{UL}$ for the left earbud 101 upgrade. As a result, unlike the example, of FIG. 2A, a total firmware upgrade time interval associated with the example of FIG. 2B is less than the sum of the upgrade time intervals associated with the left and right earbuds. In other words, $T_U<T_{UR}+T_{UL}$.

In the embodiment of FIG. 2B, the total firmware update time, $T_T$ (e.g., the total time to accomplish both the transmission of the firmware update to the earbuds and also the firmware update processes at the earbuds), may also be shortened due to the overlap in time intervals during which the left and right earbuds are updated. For example, as shown in FIG. 2B, a total firmware update time interval $T_T$ can be written as $T_T=T_{TR}+T_{UR}+T_{UL}-T_{OVU}$, where $T_{OVU}$ denotes a time interval during which $T_{UR}$ overlaps $T_{UL}$. In this example, total firmware upgrade time is given by $T_U=T_{UR}+T_{UL}-T_{OVU}$. In this example embodiment, due to overlap time $T_{OVU}$, $T_U<T_{UR}+T_{UL}$. Additionally, if transmission time $T_{TR}<T_{OVU}$, $T_T$ may be smaller than a sum of time intervals $T_{UL}$ and $T_r$. Alternatively, if $T_{TR} \geq T_{OVU}$, $T_T$ may be larger or equal than the sum of time intervals $T_{UL}$ and $T_{UR}$. In some cases, the left and right earbuds may receive the firmware update transmitted during the same time interval or during substantially overlapping time intervals. In such cases, the upgrades of both the right and left ear buds may occur at the same time (e.g., during the same time interval) or during substantially overlapping time intervals (as discussed further below).

Figure 2C:
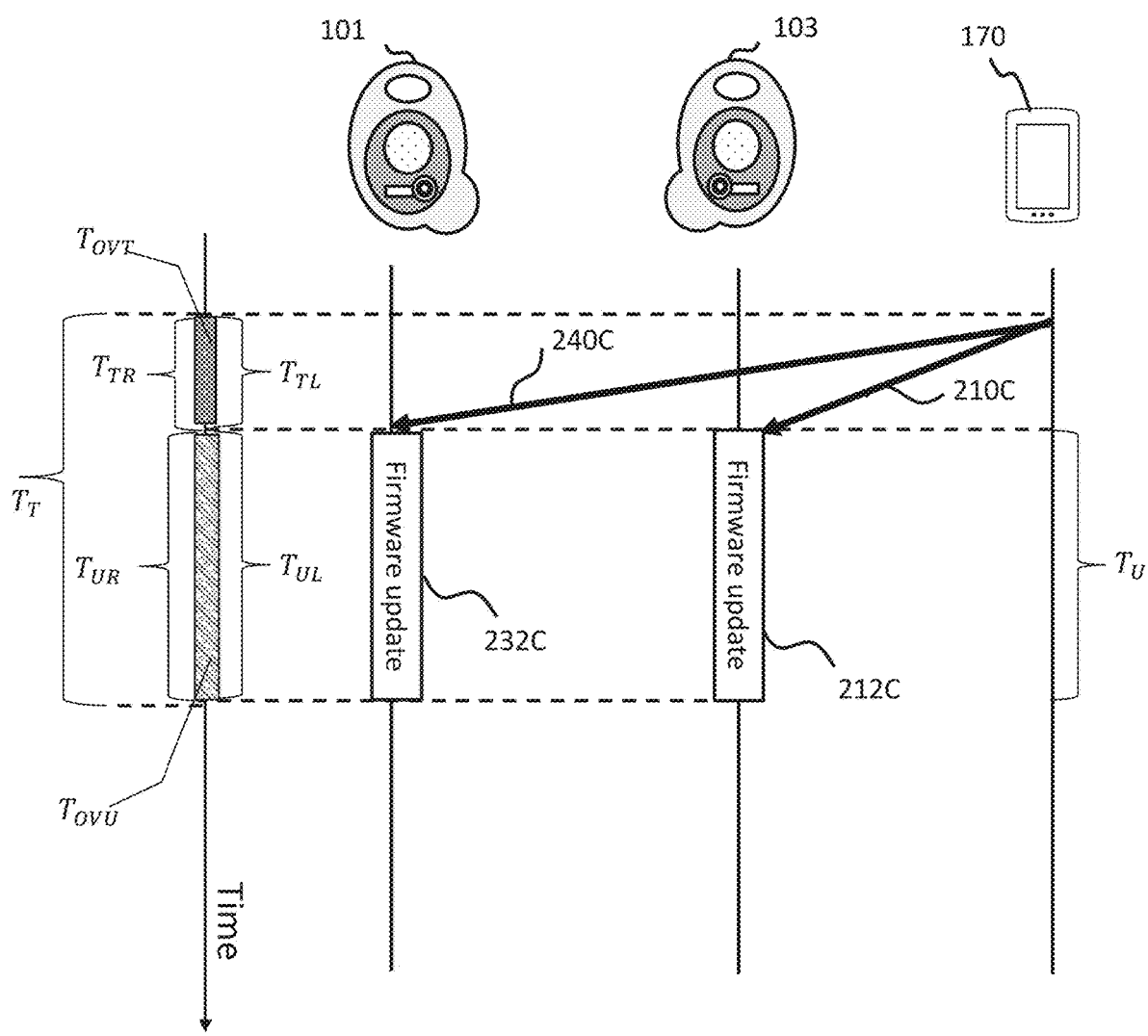

FIG. 2C shows an example embodiment of process 202, during which computing device 170 is configured to transmit firmware update information simultaneously to left earbud 101 and right earbud 103. For example, such a capability may be achieved using Bluetooth 5.0 communication, among other protocols. As FIG. 2C shows, both transmission time intervals $T_{TR}$ and $T_{TL}$ may overlap for steps 210C and 240C, and update time intervals $T_{UR}$ and $T_{UL}$ may overlap at steps 212C and 232C. In an example embodiment, a BLE, Bluetooth (e.g., Bluetooth 4.0, or Bluetooth 5.0) and the like may be used for transmission of the firmware update to right earbud 103 at step 210C and/or step 240C. In some cases, transmission times $T_{TL}$ and $T_{TR}$ may be substantially the same, and times $T_{UL}$ and $T_{UR}$ may be substantially the same. In some cases, $T_{UL}$ and $T_{UR}$ may be different. For instance, if right earbud 103 includes microphone 126R and left earbud 101 does not include microphone 126L, firmware upgrade times $T_{UL}$ and $T_{UR}$ may be different. As shown in FIG. 2C, a total firmware update time interval $T_T$ can be written as $T_T=T_{TR}+T_{TL}+T_{UR}+T_{UL}-T_{OVU}-T_{OVT}$, where, as previously described, $T_{OVU}$ denotes a time interval during which $T_{UR}$ overlaps $T_{UL}$ and t $T_{OVT}$ denotes a time interval during which $T_{TR}$ overlaps $T_{TL}$. An example embodiment depicted in FIG. 2C shows that $T_{TR}=T_{TL}=T_{OVT}$, and $T_{UR}=T_{UL}=T_{OVU}$. Therefore, in the example embodiment of FIG. 2C, $T_T=T_{TR}+T_{UR}$ For a case when $T_{TR}<T_{UL}$, $T_T$ is smaller than a sum of time intervals $T_{UL}$ and $T_{UR}$ due to an overlap of these time intervals. Additionally, because of the overlap between $T_{UL}$ and $T_{UR}$, the total firmware upgrade time $T_U$ is smaller than the sum of $T_{UL}$ and $T_{UR}$. Moreover, based at least in part on the fact that the transmission times $T_{TR}$ and $T_{TL}$ overlap, and in view of the overlap between the upgrade times $T_{UR}$ and $T_{UL}$, the total firmware update time interval $T_T$ for this example is less than the sum of $T_{TR}$, $T_{TL}$, $T_{UR}$ and $T_{UL}$.

It should be noted that while process 202 may result in a faster firmware upgrade, such a process may not be practical in all situations. For example, computing device 170 may not be able to simultaneously transmit the firmware upgrade to both of the earbuds, and, in some cases, one of the earbuds may be configured to receive a signal from computing device 170, while another earbud may not be able to communicate directly with computing device 170, but may only be configured to communicate with another earbud. For example, returning to FIG. 1A, communication path 131 may not be available between computing device 170 and left earbud 101. For such cases, processes 201 and 202 may not be available. In various embodiments, similarly numbered steps between processes 200, 201, and 202 may be the same. For example, steps 210C, 212C, and 232C of process 202 may be correspondingly the same as steps 210B, 212B, and 232B of process 201 or steps 210A, 212A, and 232A of process 200. Also step 240C of process 202 may be the same as step 240B of process 201.

FIG. 2D shows an example process 203 for upgrading the firmware of the wireless earbuds, where firmware data (e.g., data 143, as shown in FIG. 1A) is sent first to right earbud 103 from computing device 170, and subsequently transmitted to left earbud 101. In this example, arrows (e.g., arrow 251 and 252, as shown in FIG. 2D) denote a unit of data (e.g., a bit, a byte, a kilobyte, and the like) for the firmware upgrade, with a plurality of arrows for steps 210D and 230D representing the entire data of the firmware upgrade. FIG. 2D shows that transmission of the firmware upgrade to right earbud 103 may require a time $T_{TR}$, while transmission of the firmware upgrade to left earbud 101 from the right earbud 103 may require a time $T_{TL}$. In an example embodiment, BLE, Bluetooth (e.g., Bluetooth 4.0, or Bluetooth 5.0), and the like may be used for transmission of the firmware update to right earbud 103 at steps 210D, and/or step 230D. In some cases, at steps 210D of process 203, the BLE may be used, and at step 230D of process 203, the Bluetooth may be used. In some cases, at step 210D a Wi-Fi, NFC, and the like may be used. Depending on the rate of transmission from computing device 170 to right earbud 103, and from the rate of transmission from right earbud 103 to left earbud 101, time $T_{TL}$ may be different from time $T_{TR}$. For example, if BLE is used at step 210D, and Bluetooth is used at step 230D, $T_{TL}$ and $T_{TR}$ may be different. Similar to FIG. 2B, FIG. 2D shows a total update time $T_T$ that spans a time interval from the initiation of the first transmission of the firmware update to the earbuds through completion of the firmware update at the earbuds.

As shown in FIG. 2D, once a unit of data reaches right earbud 103, it may be re-transmitted to left earbud 101. In some embodiments, the delay between receiving the unit data by right earbud 103 and retransmitting the unit data by right earbud 103 to left earbud 101 may include a latency $\Delta T_{TL}$, as shown in FIG. 2D. Once the data transmission to right earbud 103 is complete after time $T_{TR}$, right earbud 103 may initiate the firmware upgrade at step 212D, while finishing transmission of the firmware data to left earbud 101. Following the transmission of the firmware data to the left earbud 101, left earbud 101 may initiate the firmware upgrade at step 232D. As previously described, the firmware upgrade for right and left earbuds 101 and 103 may occur over time periods $T_{UR}$ and $T_{UL}$, respectively, and in many cases, these time periods may be the same or approximately the same. In some cases, if one earbud (e.g., right earbud 103) has microphone 126R and left earbud 101 does not include a microphone, $T_{UR}$ may be longer to account for firmware upgrade associated with microphone 126R hardware. As shown in FIG. 2D, the total firmware update time (e.g., transmission time summed with firmware upgrade time) for the right earbud 103 may be $T_R=T_{TR}+T_{UR}$ and total firmware update time for the for left earbud 101 may be $T_L=\Delta T_{TL}+T_{TL}+T_{UL}$, wherein time intervals $T_R$ and $T_L$ are measured from the point in time when the update is started. The total firmware update time interval for the pair of earbuds using process 203 may then be $T_T=MAX(T_R, T_L)$, where function MAX returns the maximum value of either $T_R$ or $T_L$. In various embodiments, similarly numbered steps between processes 200, 201, 202, and 203 may be the same. For example, steps 210D, 212D, 230D, and 232D of process 203 may be correspondingly the same as steps 210A, 212A, 230A, and 232A of process 200. As in the examples described above, in the example of FIG. 2D, because $T_{UL}$ overlaps $T_{UR}$, the total firmware upgrade time $T_U$ is smaller than the sum of $T_{UL}$ and $T_{UR}$.

Figure 2E:
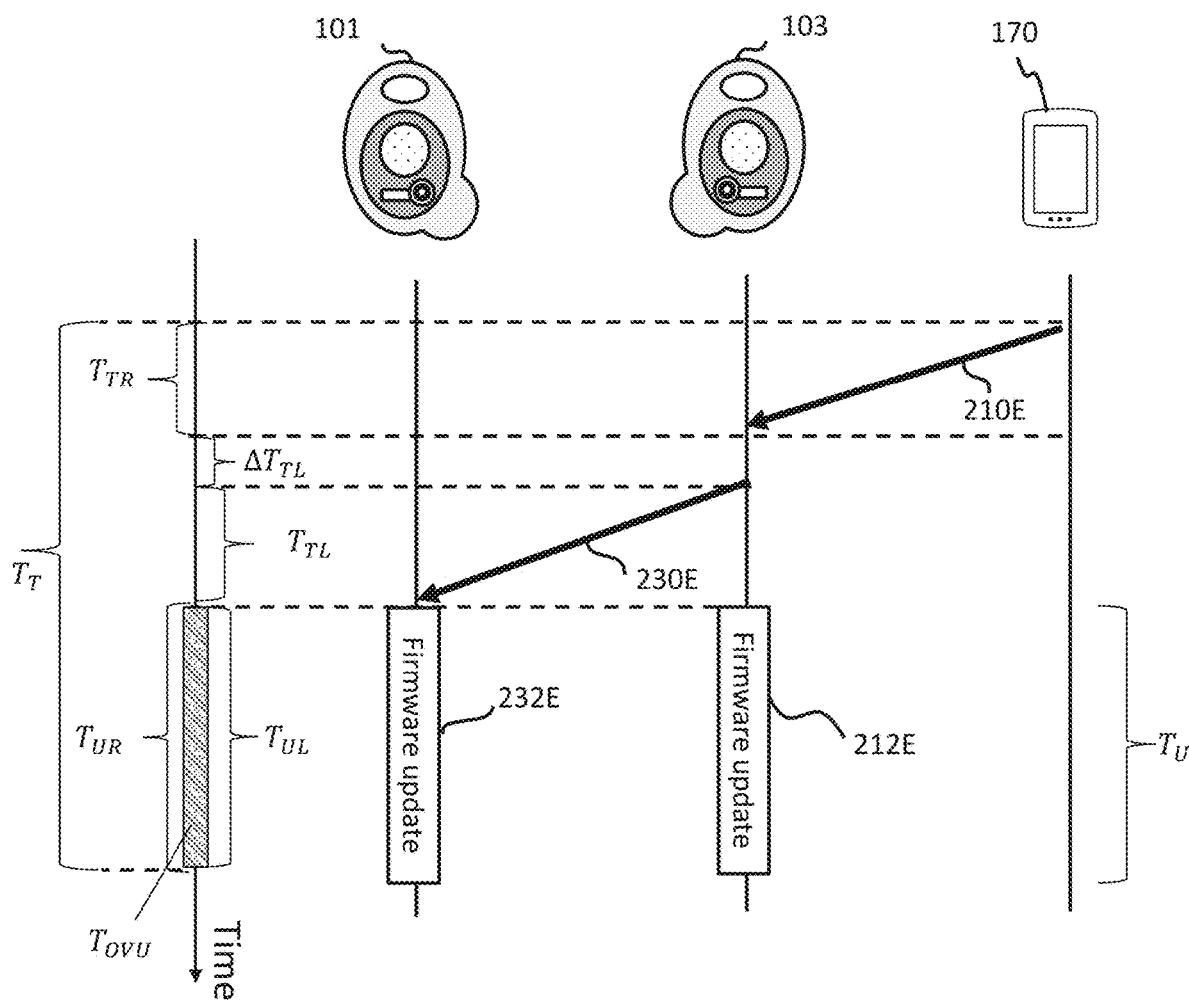

In some cases, depending on a hardware configuration of right earbud 103, right earbud 103 may not be able to receive and retransmit data at the same time. In such a case, a firmware upgrade process may be described by process 204, as shown in FIG. 2E. For instance, at step 210E, right earbud 103 may receive the firmware data, and at step 230E, right earbud 103 may retransmit the same firmware data to left earbud 101. In various embodiments, a time lag $\Delta T_{TL}$ may be present, as shown in FIG. 2D. At steps 212E and 232E respective right and left earbuds may update the firmware. In an example embodiment, step 210E may take $T_{TR}$ time, step 230E may take $T_{TL}$ time and steps 212E and 232E may take respectively $T_{UR}$ and $T_{UL}$ times. The total firmware update time using process 204 may then be $T_T=T_{TR}+\Delta T_{TL}+T_{TL}+$ MAX($T_{UR}$, $T_{UL}$). In some cases, at step 210E of process 204, the BLE may be used, and at step 230E of process 204, the Bluetooth may be used. In some cases, at step 210E a Wi-Fi, NFC, and the like may be used. Depending on the rate of transmission from computing device 170 to right earbud 103, and from the rate of transmission from right earbud 103 to left earbud 101, time $T_{TL}$ may be different from time $T_{TR}$. For example, if BLE is used at step 210E, and Bluetooth is used at step 230E, $T_{TL}$ and $T_{TR}$ may be different. In various embodiments, similarly numbered steps between processes 200, 201, 202, 203, and 204 may be the same. For example, steps 210E, 212E, 230E, and 232E of process 203 may be correspondingly the same as steps 210A, 212A, 230A, and 232A of process 200. In the example of FIG. 2E, because $T_{UL}$ overlaps $T_{UR}$, the total firmware upgrade time $T_U$ is smaller than the sum of $T_{UL}$ and $T_{UR}$. Further for cases when $T_{TR}+\Delta T_{TL}+T_{TL}<T_{OVU}$, total update time $T_T$ is smaller than the sum of $T_{UL}$ and $T_{UR}$.

The presently disclosed systems and methods as described, for example, in reference to FIGS. 2B-2E may streamline the upgrade process for a pair of earbuds. In some cases, the step of transmitting different firmware versions to different earbuds may be avoided. Instead, a single firmware version may be used for both right earbud 103 and left earbud 101. Further, upgrading of both the left and right earbuds may occur simultaneously (that is, during at least partially overlapping time periods), as described above.

When a single firmware version is used for right and left earbuds 103 and 101 (as for example in processes 203 and 204, shown in respective FIGS. 2D and 2E), a firmware upgrade process can differentiate between right earbud 103 and left earbud 101, because upgrade of right earbud 103 may be different from upgrade of left earbud 101. For example, right earbud 103 may receive firmware upgrades related to a right audio signal transmitted by computing device 170, and left earbud 101 may receive firmware upgrades related to a left audio signal transmitted by computing device 170. In various embodiments, in order to apply an appropriate firmware upgrade, the right earbud 103 and left earbud 101 may need to be identified. For example, left and right earbuds 101 and 103 may be configured with one or more identifiers. Such identifiers may facilitate differentiation between the earbuds.

In an example embodiment, one of the earbuds (e.g., right earbud 103) may receive the firmware upgrade that may, for example, be a computer code (e.g., firmware software 160, as shown in FIG. 1B). Processor 155R may execute firmware software 160, and software 160 may inquire whether an upgrade is to be done for left earbud 101 or right earbud 103. In an example embodiment, software 160 may access at least one identifier for an earbud, for which the upgrade is needed, to determine whether the earbud is left earbud 101 or right earbud 103.

Any suitable identifier or group of identifiers may be used to identify an earbud. For example, right earbud 103 may store in a non-transient memory (e.g., memory 153R) a first data bit data that identifies it as right earbud 103, while left earbud 101 may store in memory 153L a second data bit that identifies it as left earbud 101. When software 160 accesses the first data bit, it may be configured to execute a portion of software 160 related to firmware upgrade of right earbud 103, and when software 160 accesses the second data bit, it may be configured to execute another portion of software 160 related to firmware upgrade of left earbud 101.

It should be noted that any other suitable identifier or approach may be used by software 160 to identify whether the upgrade is needed for the right earbud 103 or left earbud 101. For instance, such a determination may be done by analyzing the configuration of chip 124L or 124R to identify whether an earbud is left earbud 101 or right earbud 103. For example, chip 124R may include electrical components (e.g., pins) that may be assigned to different voltage. In an example embodiment, pin assignments of chip 124R or chip 124L may include, for example, common ground (GND), power supply, programmable input/output (PIO) including bidirectional with programmable strength internal pull-up/down, universal asynchronous receiver-transmitter (UART) data input, bidirectional universal serial bus (USB) data, synchronous data input, synchronous data clock, synchronous data sync, and the like.

Figure 3A:
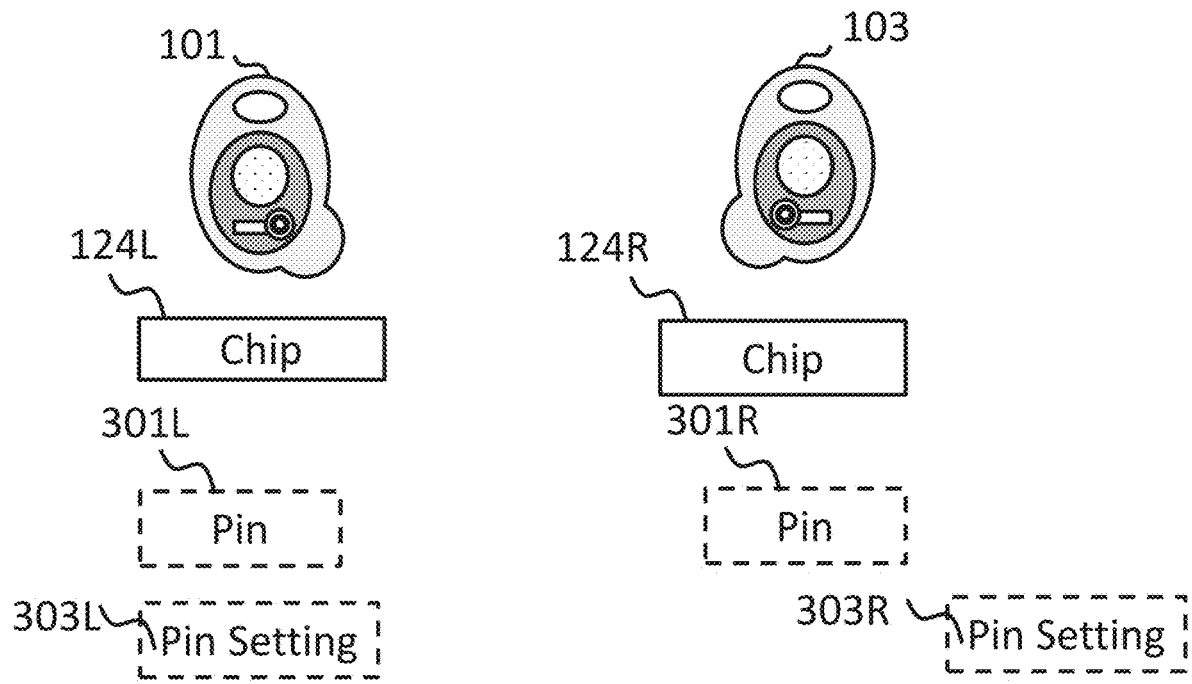
FIGS. 3A-3B shows example components of the left and right earbud, consistent with the present disclosure.
Figure 3B:
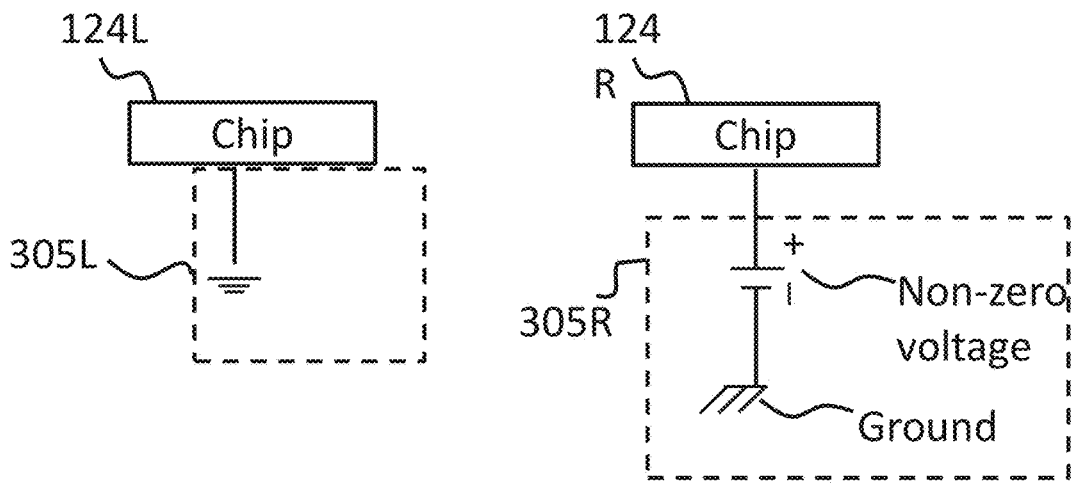

In at least one embodiment of the present disclosure, a pin of chip 124R may be set to a different voltage than the same pin of chip 124L. For example, FIG. 3A show left and right earbuds 101 and 103 with chip 124L having left pin 301L, and pin setting 303L, and chip 124R having right pin 301R and pin setting 303R. In some embodiments, pin setting 303L for pin 301L may be set to a voltage 305L, as shown in FIG. 3B, and pin setting 303R for pin 301R may be set to a voltage 305R. Voltages 305L and 305R may have different values. For example, in some embodiments, voltage 305L may be set to a ground voltage, as shown in FIG. 3B, and voltage 305R may be set to a nonzero suitable voltage, as shown in FIG. 3B (e.g., 1.8V). In other embodiments, the values of voltages 305L and 305R may include any suitable values that are different from each other. The difference between the voltages 305L and 305R may be used to identify left earbud 101 and right earbud 103. In some embodiments, voltages 305L and 305R may be nonzero voltages.

In some embodiments of the present disclosure, a first voltage 305L may be set on the bidirectional programmable strength pull-up/pull-down PIN in left earbud 101, and a second voltage 305R may be set on the bidirectional programmable strength pull-up/pull-down PIN in right earbud 103. The difference between voltages 305L and 305R may be used to identify left earbud 101 and right earbud 103.

Figure 4:
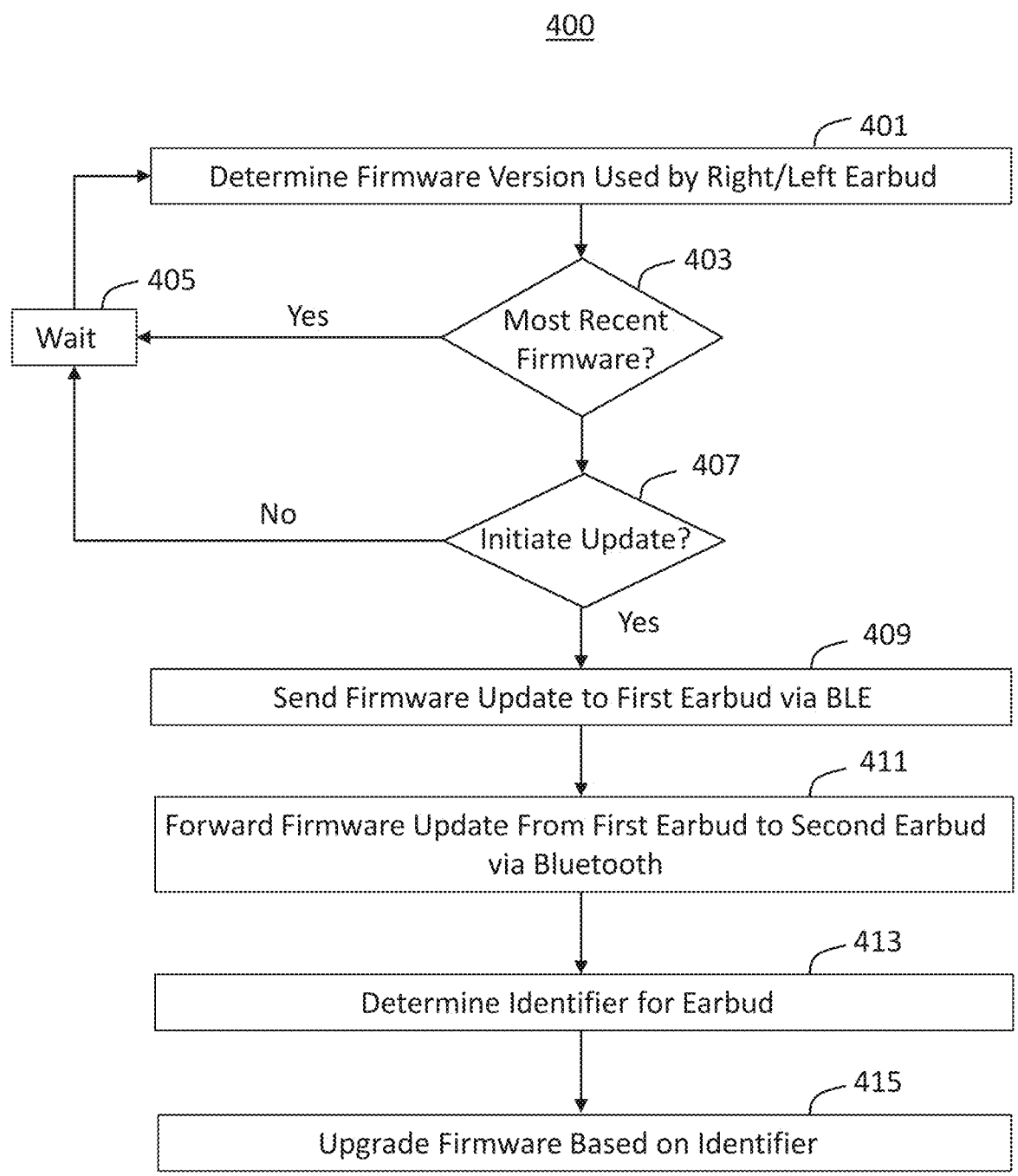
FIG. 4 is an example flow chart for a process of upgrading the firmware in a pair of earbuds, consistent with the present disclosure.

FIG. 4 is a flowchart of an exemplary process 400 to simultaneously update left earbud 101 and the right earbud 103, consistent with the disclosed embodiments. At step 401, computing device 170 may communicate with database 180 or server 181 to determine if the firmware version currently used by the pair of earbuds is the most recent. At step 403, computing device 170 may compare the version of the firmware available for device 170 with the most recent version available at database 180. If the most recent version available at database 180 is the same as the version available for device 170, (step 403, Yes) process 400 may proceed to step 405, and require computing device 170 to wait for a predetermined amount of time (e.g., a day, a week, a month, and the like) before proceeding to step 401. Alternatively, if the most recent version available at database 180 is different from the version available for device 170 (step 403, No), process 400 may proceed to step 407 and determine if an update may be initiated. For example, at step 407, device 170 may request from a user an authorization for initiating the update. If the update is not authorized (step 407, No) when the user does not respond to the authorization request, or when the user denies authorization request, process may proceed to step 405. Alternatively, if the update is authorized (step 407, Yes) process 400 may proceed to step 409 and send the firmware update to a first earbud (e.g., right earbud 103). In various embodiments, during step 409, the firmware update may be forwarded from computing device 170 using BLE. In an example embodiment, step 409 may be the same as step 210A-210E of respective processes 201-204, as shown in respective FIGS. 2A-2E.

At step 411 of process 400, the first earbud is configured to forward the received firmware upgrade to a second earbud (e.g., left earbud 101) via Bluetooth. In various embodiments, step 411 of process 400 may be the same as steps 230A, 230D, and 230E of processes 200, 203, and 204, as shown in respective FIGS. 2A, 2D, and 2E. As described above, step 411 may be carried after completion of step 409 (as shown, for example in FIG. 2E, by steps 210E and 230E corresponding respectively to steps 409 and 411). Alternatively, step 411 may be started before completion of step 409 (as shown, for example in FIG. 2D, by steps 210D and steps 230D corresponding respectively to steps 409 and 411).

In various embodiments, upon receiving the firmware update at step 413, a processor of each earbud (e.g., processor 155L and processor 155R) may execute a first part of firmware update (e.g., a first portion of the code associated with firmware update) to determine an identifier associated with each earbud as previously discussed. The identifier may allow determination whether firmware update for right earbud 103 or left earbud 101 needs to be used. At step 415, based on the identifier, each earbud may be updated. For example, left earbud 101 may be updated using a portion of firmware update code related to left earbud 101, and right earbud 103 may be updated using a portion of firmware update code related to right earbud 103. In an example embodiment, an identifier based on electronic characteristics of left and right earbuds 101 and 103 may be used. For instance, as described above, at step 413, processor 155L or processor 155R may analyze the configuration of chip 124L or 124R to identify whether an earbud is left earbud 101 or right earbud 103. For example, chip 124R or chip 124L may include pins 301L and 301R having voltages 305L and 305R, where voltage 305L is different from voltage 305R. Such difference may be an identifier used to infer whether an earbud that requires firmware update is left earbud 101 or right earbud 103.

Figure 5:
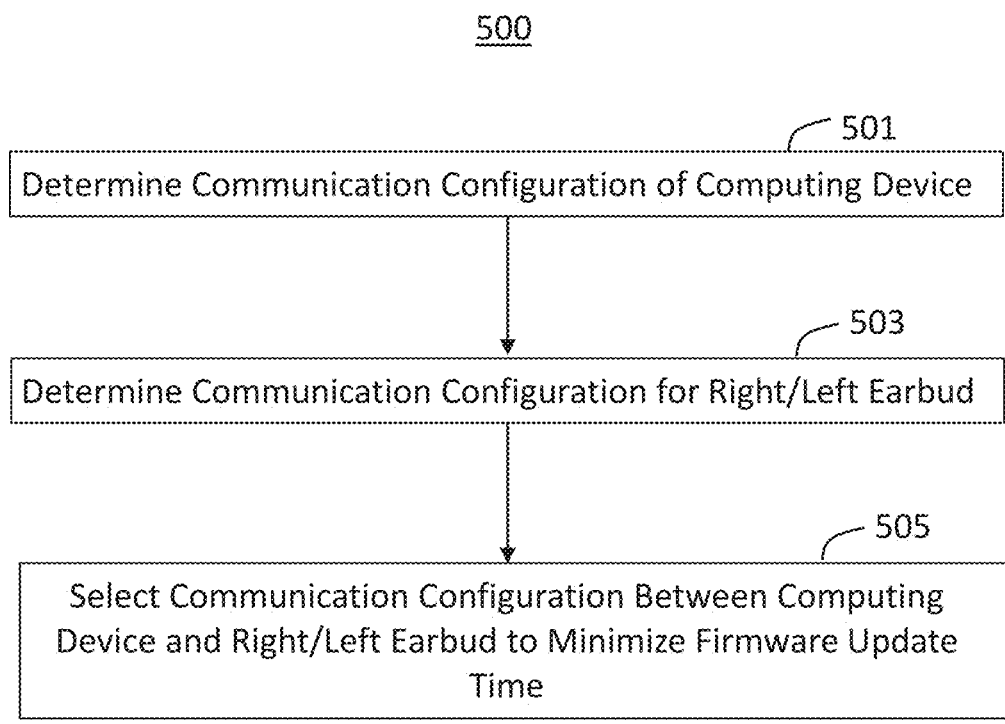
FIG. 5 is another example flow chart for a process of upgrading the firmware in a pair of earbuds, consistent with the present disclosure.

FIG. 5 is a flowchart of an exemplary process 500 for updating left earbud 101 and the right earbud 103, consistent with the disclosed embodiments. At step 501, application 171 of computing device 170 may analyze hardware and software related to wireless communication of computing device 170 to determine supported communication configurations of computing device 170 that may be used to communicate with earbuds 101 and 103. For example, application 171 may determine that computing device 170 may use Bluetooth 4.0, Bluetooth 5.0, and BLE for communicating with remote wireless devices such as earbuds 101 and 103.

At step 503, computing device 107 may determine supported communication configurations of wireless device(s) such as earbuds 101 and 103. For instance, computing device 107 may determine that earbuds 101 and 103 may support Bluetooth 4.0 communication, but may not support BLE. In some cases, computing device 170 may determine that firmware update data may be communicated simultaneously to both earbuds 101 and 103, and in some cases, computing device 170 may determine that only one earbud (e.g., right earbud 103) is configured to establish communication with computing device 170, while left earbud 101 may only be allowed to communicate with right earbud 103. In an example embodiment, determining a communication configuration of earbuds 101 and 103 may be established via an exchange of signals from device 170 to earbuds 101 and 103. For instance, device 170 may attempt to establish simultaneous communication with both earbuds 101 and 103. If such communication fails, device 170 may attempt to establish communication with only one earbud (e.g., right earbud 103). Upon establishing connection, computing device 170 may determine possible ways to communicate with earbud 103 (e.g., using BLE, Bluetooth 4.0, and the like).

At step 505, depending on communication configurations of computing device 170, and communication configurations of earbuds 101 and 103, computing device 170 may select a process of updating the firmware that results in the shortest time for the update. For example, if computing device 170 is configured to communicate simultaneously with left earbud 101 and right earbud 103 (e.g., using Bluetooth 5.0) application 171 of computing device may determine to upgrade earbuds 101 and 103 using process 202, as shown in FIG. 2C. Alternatively, if application 171 of computing device 170 determined that there is no communication channel available between computing device 170 and, for example, left earbud 101, application 171 may select process 203 for updating the firmware of earbuds 101 and 103. In various embodiments, the selection of process 200-204 may be determined based on suitable wireless communication capabilities of computing device 170 and earbuds 101 and 103, where the wireless communication capabilities may be analyzed automatically by application 171 at the onset of the firmware update.

It should be noted, that while discussion above is related to wireless earbuds, similar processes of upgrading firmware may be applied to other wirelessly connected devices such as speakers, headphones, or any other suitable devices that can wirelessly communicate with device 170 and may have physically separated wirelessly connected components (e.g., wireless earbuds of a wireless headset). In some embodiments, several computing devices may be used to transmit a firmware update to one or more wireless devices or to one or more wirelessly connected components of a wireless device. For instance, several computing devices may either synchronously or asynchronously upload a firmware update to a memory of a first component and a second component of a wireless device.

It is to be understood that the configuration and the functionality of components of computing device 170 and wireless earbuds have been defined herein for the convenience of the description. Alternative configurations can be defined as long as the specified functions and relationships thereof are appropriately performed. Alternatives (including equivalents, extensions, variations, deviations, etc., of those described herein) will be apparent. Such alternatives fall within the scope and spirit of the disclosed embodiments.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application; such examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents which may be resorted to fall within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A method of updating firmware in a pair of wireless earbuds comprising at least a first earbud and a second earbud, the first earbud and the second earbud communicating with each other, the method comprising:
   wirelessly starting to receive at the first earbud a firmware update transmitted by a computing device at a first time, and completing both receiving and storing the firmware update at the first earbud within a first transmission time interval, wherein the firmware update includes both a first earbud update component and a second earbud update component;
   wirelessly starting to receive the second earbud update component sent by the first earbud at a second time at the second earbud, and completing both receiving and storing the second earbud update component at the second earbud within a second transmission time interval, wherein the second time is later than the first time by a time interval $\Delta T_{TL}$, and wherein the first transmission time interval and the second transmission time interval only partially overlap;
   after the first transmission time interval, upgrading the first earbud, using the first earbud update component, during a first upgrade time interval; and
   after the second transmission time interval, upgrading the second earbud, using the second earbud update, component during a second upgrade time interval,
   wherein the first upgrade time interval and the second transmission time interval partially overlap and the first earbud executes operation of both upgrading the first earbud and transmitting the second earbud update component simultaneously in the overlap of the first upgrade time interval and the second transmission time interval, and the first upgrade time interval and the second upgrade time interval at least partially overlap resulting in a total firmware upgrade time interval for upgrading the first and the second earbuds being shorter than a sum of the first upgrade time interval and the second upgrade time interval.

2. The method of claim 1 further comprising:
selecting the first earbud update component from the firmware update using a first earbud identifier; and
selecting the second earbud update component from the firmware update using a second earbud identifier.

3. The method of claim 2, wherein each of the first earbud and the second earbud includes a programmable Bluetooth chip, and wherein the programmable Bluetooth chip in each of the first earbud and the second earbud includes a bidirectional programmable strength pull-up/pull-down pin.

4. The method of claim 3, wherein the bidirectional programmable strength pull-up/pull-down pin in the first earbud is used as the first earbud identifier, and the bidirectional programmable strength pull-up/pull-down pin in the second earbud is used as the second earbud identifier.

5. The method of claim 3 further comprising selecting the first earbud update component from the firmware update based on a first voltage set on the bidirectional programmable strength pull-up/pull-down pin in the first earbud and selecting the second earbud update component from the firmware update based on a second voltage set on the bidirectional programmable strength pull-up/pull-down pin in the second earbud.

6. The method of claim 5, wherein the first voltage is different than the second voltage.

7. The method of claim 5, wherein the first voltage is used as the first earbud identifier, and the second voltage is used as the second earbud identifier.

8. The method of claim 1 further comprising determining a version of the firmware currently used by the first earbud and the second earbud.

9. The method of claim 1, wherein the only partial overlap of the first transmission time interval and the second transmission time interval causes a total update time for receiving the firmware update at the first earbud, receiving the second earbud update component at the second earbud, and upgrading the first and the second earbuds to be shorter than a sum of the first transmission time interval, the second transmission time interval, the first upgrade time interval, and the second upgrade time interval.

10. A system comprising a pair of wireless earbuds comprising at least a first earbud and a second earbud, the first earbud and the second ear bud communicating with each other, at least the first earbud being configured to communicate with a computing device, the system comprising:
at least one processor associated with the first earbud, the at least one processor of the first earbud being configured to:
receive a firmware update transmitted by the computing device at the first earbud at a first time, and complete both receiving and storing the firmware update at the first earbud within a first transmission time interval, wherein the firmware update includes both a first earbud update component and a second earbud update component; and
after the first transmission time interval, use the first earbud update component to upgrade the first earbud during a first upgrade time interval; and
at least one processor associated with the second earbud, the at least one processor of the second earbud being configured to:
receive the second earbud update component from the first earbud at a second time at the second earbud, and complete both receiving and storing the second earbud update component at the second earbud within a second transmission time interval, wherein the second time is later than the first time by a time interval $\Delta T_{TL}$, and wherein the first transmission time interval and the second transmission time interval only partially overlap; and
after the second transmission time interval, use the second earbud update component to upgrade the second earbud during a second upgrade time interval,
wherein the first upgrade time interval and the second transmission time interval partially overlap and the first earbud executes operation of both upgrading the first earbud and transmitting the second earbud update component simultaneously within the overlap of the first upgrade time interval and the second transmission time interval, and the first upgrade time interval and the second upgrade time interval at least partially overlap resulting in a total time interval for upgrading the first and the second earbuds being shorter than a sum of the first and the second upgrade time intervals.

11. The system of claim 10 further comprising a first wireless communication unit associated with the first earbud and a second wireless communication unit associated with the second earbud, the first and the second wireless communication units being configured to enable wireless communication between the first earbud and the second earbud via Bluetooth.

12. The system of claim 11, wherein the first wireless communication unit is configured to communicate with the computing device via Bluetooth Low Energy wireless communication.

13. The system of claim 10, wherein the at least one processor associated with the first earbud is configured to select first earbud update component from the firmware update using a first earbud identifier and select second earbud update component from the firmware update using a second earbud identifier.

14. The system of claim 13, wherein each of the first earbud and the second earbud includes a programmable Bluetooth chip, and wherein the programmable Bluetooth chip in each of the first earbud and the second earbud includes a bidirectional programmable strength pull-up/pull-down pin.

15. The system of claim 14, wherein the bidirectional programmable strength pull-up/pull-down pin in the first earbud is used as the first earbud identifier, and the bidirectional programmable strength pull-up/pull-down pin in the second earbud is used as the second earbud identifier.

16. The system of claim 15, wherein the at least one processor associated with the first earbud is configured to select the first earbud update component from the firmware update based on a first voltage set on the bidirectional programmable strength pull-up/pull-down pin in the first earbud, and select the second earbud update component from the firmware update based on a second voltage set on the bidirectional programmable strength pull-up/pull-down pin in the second earbud.

17. The system of claim 16, wherein the first voltage is used as the first earbud identifier and the second voltage is used as the second earbud identifier.

18. The system of claim 10, wherein the only partial overlap of the first transmission time interval and the second transmission time interval causes a total update time for receiving the firmware update at the first earbud, receiving the second earbud update component at the second earbud, and upgrading the first and the second earbuds to be shorter than a sum of the first transmission time interval, the second transmission time interval, the first upgrade time interval, and the second upgrade time interval.

* * * * *